(12) United States Patent
Morita et al.

(10) Patent No.: US 7,399,803 B2
(45) Date of Patent: Jul. 15, 2008

(54) COMPOSITE CURED SILICONE POWDER, METHOD FOR PRODUCTION THEREOF, AND AQUEOUS COMPOSITION

(75) Inventors: Yoshitsugu Morita, Chiba Prefecture (JP); Kazuo Kobayashi, Chiba Prefecture (JP)

(73) Assignee: Dow Corning Toray Company, Ltd., Tokyo (JP)

( * ) Notice: Subject to any disclaimer, the term of this patent is extended or adjusted under 35 U.S.C. 154(b) by 284 days.

(21) Appl. No.: 10/538,819

(22) PCT Filed: Dec. 8, 2003

(86) PCT No.: PCT/JP03/15690

§ 371 (c)(1), (2), (4) Date: Jun. 13, 2005

(87) PCT Pub. No.: WO2004/055099

PCT Pub. Date: Jul. 1, 2004

(65) Prior Publication Data
US 2006/0058440 A1 Mar. 16, 2006

(30) Foreign Application Priority Data
Dec. 13, 2002 (JP) .................... 2002-362557

(51) Int. Cl.
C08K 3/22 (2006.01)
C08K 3/34 (2006.01)
(52) U.S. Cl. ..................... 524/430; 524/492
(58) Field of Classification Search ............. 524/492
See application file for complete search history.

(56) References Cited

U.S. PATENT DOCUMENTS

| 4,210,571 | A | * | 7/1980 | Herman ................ 523/200 |
| 4,210,572 | A | * | 7/1980 | Herman et al. ............ 523/200 |
| 4,356,098 | A | * | 10/1982 | Chagnon ............ 252/62.51 R |
| 4,594,134 | A | | 6/1986 | Hanada et al. |
| 4,687,596 | A | * | 8/1987 | Borduz et al. ............ 250/510 |
| 4,742,142 | A | | 5/1988 | Shimizu et al. |
| 4,743,670 | A | | 5/1988 | Yoshida et al. |
| 5,387,624 | A | * | 2/1995 | Morita et al. ............ 523/220 |
| 5,492,945 | A | | 2/1996 | Morita et al. |
| 5,536,537 | A | * | 7/1996 | Mizushima et al. ......... 427/387 |
| 5,538,793 | A | | 7/1996 | Inokuchi et al. |
| 5,762,840 | A | * | 6/1998 | Tsai et al. ................ 264/41 |
| 5,766,760 | A | * | 6/1998 | Tsai et al. ............... 428/376 |
| 5,945,471 | A | * | 8/1999 | Morita et al. ............ 524/409 |
| 5,948,469 | A | | 9/1999 | Morita et al. |
| 6,068,785 | A | * | 5/2000 | Raj et al. ............... 252/62.52 |
| 6,159,396 | A | * | 12/2000 | Fujita et al. ............. 252/572 |
| 6,258,426 | B1 | * | 7/2001 | Yamamoto et al. ........ 428/40.1 |
| 7,063,802 | B2 | * | 6/2006 | Tsuda et al. ............. 252/62.52 |
| 2003/0216505 | A1 | * | 11/2003 | Akiba et al. ............. 524/588 |

FOREIGN PATENT DOCUMENTS

| EP | 0 350 519 | 7/1988 |
| EP | 0 552 546 | 12/1992 |
| EP | 0 548 969 | 6/1993 |
| JP | 59-68333 | 4/1984 |
| JP | 62-243621 | 10/1987 |
| JP | 63-77942 | 4/1988 |
| JP | 63-202658 | 8/1988 |
| JP | 4-348143 | 12/1992 |
| JP | 5-179114 | 7/1993 |
| JP | 5-179144 | 7/1993 |
| JP | 7-102075 | 4/1995 |
| JP | 7-196815 | 8/1995 |
| JP | 9-208709 | 8/1997 |

* cited by examiner

*Primary Examiner*—Randy Gulakowski
*Assistant Examiner*—Robert Loewe
(74) *Attorney, Agent, or Firm*—Howard & Howard Attorneys, P.C.

(57) ABSTRACT

A composite cured silicone powder comprising: cured silicone powder (A) that has an average particle size of 0.1 to 500 micrometers; an inorganic fine powder (B) coated on the surface of said cured silicone powder (A); and a surface-active agent (C) coated on the surface of said inorganic fine powder (B); a method for producing the composite cured silicone powder which comprises the step of mixing the following components under conditions of mechanical shearing: (A) a cured silicone powder that has an average particle size of 0.1 to 500 micrometers, (B) an inorganic fine powder, and (C) a surface-active agent.

20 Claims, No Drawings

COMPOSITE CURED SILICONE POWDER, METHOD FOR PRODUCTION THEREOF, AND AQUEOUS COMPOSITION

TECHNICAL FIELD

The present invention relates to a composite cured silicone powder comprising a cured silicone powder and an inorganic fine powder, as well as to a method of manufacturing the aforementioned composite powder. More specifically, the invention relates to a composite cured silicone powder that possesses excellent flowability, hydrophilic properties, and dispersibility, as well as to the method of manufacturing the aforementioned powder, and to an aqueous composition that comprises the aforementioned composite cured powder.

BACKGROUND ART

Cured silicone powders are used as additives, for example, to cosmetics, paints, inks, thermosetting organic resins, and thermoplastic organic resins. Cured silicone powders are particularly well suited for use as internal stress relaxers for thermosetting organic resins and as surface lubricants for organic resin films.

Cured silicone powders can be produced, for example, by grinding silicone rubber, by curing a liquid silicone rubber composition while spray drying (see Japanese Patent Application Laid Open Number [hereinafter referred to as "Kokai"] S59-68333), and by curing a liquid silicone rubber composition while it is dispersed in water (see Kokai S62-243621, Kokai S63-77942, Kokai S63-202658, and Kokai S64-70558).

However, the cured silicone powders afforded by these methods have a strong tendency to aggregate and, as a result, have a poor flowability. Further, they have poor dispersibility in aqueous coating materials, cosmetic materials, or similar aqueous compositions. If a cured silicone powder is non-uniformly dispersed in an aqueous composition and forms aggregates, it is difficult to provide uniform surface dullness, when used in coating materials, and impairs tactile feeling, when used in cosmetic products.

Composite cured silicone powders with adherence of the inorganic fine powder to the surfaces of the composite powders and with improved flowability have been proposed (see Kokai H4-348143, Kokai H5-179144, and Kokai H7-102075). These composite cured silicone powders, however, exhibit poor hydrophilicity, and thus impart poor hydrophilicity to aqueous compositions in those applications where they are blended with such compositions.

It has also been proposed (see Kokai H7-196815) to coat the surfaces of silicone rubber powder particles with a polyorganosilsesquioxane resin, or to coat the surfaces of particles of oil-containing silicone powder with an organic fine powder (see Kokai H9-208709).

However, the aforementioned composite cured silicone powders still had insufficient hydrophilicity and dispersibility in aqueous compositions.

DISCLOSURE OF INVENTION

The object of the present invention is to provide a composite cured silicone powder of excellent flowability, hydrophilicity, and dispersibility. It is another object to provide a method of manufacturing the aforementioned powder.

As a result of studies aimed at the solution of the problems of the prior-art technique, the authors arrived at the present invention.

More specifically, the invention provides a composite cured silicone powder comprising: a cured silicone powder (A) that has an average particle size of 0.1 to 500 micrometers; an inorganic fine powder (B) coated on the surface of said cured silicone powder (A); and a surface-active agent (C) coated on the surface of said inorganic fine powder.

The composite cured silicone powder of the invention is prepared by compounding the aforementioned cured silicone powder (A), the inorganic fine powder (B), and the surface-active agent (C) under conditions of mechanical shearing.

It is recommended to use the inorganic fine powder (B) in the form of a fine powder of a metal oxide.

It is also recommended that the specific surface area of the inorganic fine powder (B) exceed 10 $m^2/g$.

The inorganic fine powder (B) may also comprise silica.

It is recommended to use the aforementioned cured silicone powder (A) in the form of a silicone rubber powder.

A method of the invention for manufacturing a composite cured silicone powder comprises the step of mixing the following components under conditions of mechanical shearing: a cured silicone powder (A) that has an average particle size of 0.1 to 500 micrometers, an inorganic fine powder (B), and a surface-active agent (C).

The method of the invention for manufacturing a composite cured silicone powder can be carried out by mixing the cured silicone powder (A) and the inorganic fine powder (B) with mechanical shearing and then compounding the obtained mixture with the aforementioned surface-active agent (C) by applying mechanical shearing.

An aqueous composition of the invention may be prepared from the aforementioned composite cured silicone powder.

BEST MODE FOR CARRYING OUT THE INVENTION

The composite cured silicone powder according to the present invention comprises a cured silicone powder (A) that has an average particle size of 0.1 to 500 micrometers, an inorganic fine powder (B) coated on the surface of the cured silicone powder (A); and a surface-active agent (C) coated on the surface of the inorganic fine powder (B).

[Cured Silicone Powder (A)]

The cured silicone powder (A) are made from materials that have siloxane bonds in their structure and can be obtained, e.g., by curing organosilane or organopolysiloxane by crosslinking reaction and then grinding the reaction product into a powder. The cured silicone powder (A) can be, for example, a silicone gel powder, silicone rubber powder, or silicone resin powder, silicone rubber powder being particularly preferred from the point of view of adjustability of hardness and characteristics suitable for specific applications. The cured silicone powder (A) can be prepared by curing reactions based on, for example, addition reaction, condensation reaction, reaction promoted by an organoperoxide, reaction promoted by ultraviolet radiation, and the like. Particularly preferred are cured silicone powders prepared by curing through the addition reaction or condensation reaction.

Physical properties of the cured silicone powder (A) are not critical, but the JIS (Japanese Industrial Standard) A durometer hardness preferably should not exceed 90, preferably should be less than 50, when the cured silicone powder is a silicone rubber powder.

The average particle size of the cured silicone powder (A) should be from about 0.1 to about 500 micrometers, preferably 0.1 to about 200 micrometers, and even more preferably from 0.1 to 100 micrometers. Coating the surface of cured silicone powder with a fine inorganic powder becomes highly problematic when the average particle size of the cured silicone powder is below the aforementioned minimal size. On the other hand, a composite cured silicone powder prepared from cured silicone powder having an average particle size above the upper recommended value is not readily dispersible in aqueous compositions.

The cured silicone powder (A) may contain a non-crosslinking oil. The non-crosslinking oil is an oil that is contained in the cured silicone powder and naturally exudes from the powder or can be extracted therefrom with an organic solvent. Such oils are exemplified by non-crosslinking silicone oils and non-crosslinking organic oils. The aforementioned silicone oils do not take part in the curing reaction used in the preparation of the cured silicone powder. A straight chain structure, a straight chain structure with partial branching, a ring-shaped structure, or a branched chain structure are suitable structures, among which the straight-chain structure is particularly preferred. Dimethylpolysiloxanes having both ends of the molecular chain blocked with trimethylsiloxy groups, polysiloxanes obtained by substituting alkyl groups other than methyl, as well as phenyl groups and 3,3,3-trifluoropropyl groups, for some of the methyl groups of such dimethylpolysiloxanes, and other non-reactive silicone oils are representative of such silicone oils.

Further, when the non-crosslinking silicone oil is introduced in advance to the curable silicone compositions, for which the reaction used to form the cured silicone powders is an addition reaction, the following non-crosslinking oils, other than the aforementioned non-reacting silicone oil, can be used: dimethylpolysiloxanes having both ends of the molecular chain blocked with silanol groups, polysiloxane oils obtained by substituting alkyl groups other than methyl, as well as phenyl groups and 3,3,3-trifluoropropyl groups; dimethylpolysiloxanes having both molecular terminals blocked with dimethylvinylsiloxy groups that could have taken part in the addition reaction but remained unreacted, copolymers of methylvinylsiloxane and dimethylsiloxane having both molecular terminals blocked with trimethylsiloxy groups, dimethylpolysiloxanes having both molecular terminals blocked with dimethylhydrogensiloxy groups, copolymers of methylhydrogensiloxane and dimethylsiloxane having both molecular terminals blocked with trimethylsiloxy groups, and polysiloxanes, in which part of the methyl groups of the polysiloxane is substituted by groups other than methyl, such as alkyl groups, phenyl groups, and 3,3,3-trifluoropropyl groups.

Further, when the non-crosslinking silicone oil is introduced in advance in the curable silicone compositions for which the reaction used to form the cured silicone powders is a condensation reaction, the following oils, other than the aforementioned non-reactive silicone oil, can be used: silicone oils, such as polysiloxanes, in which a part of methyl groups of the aforementioned non-reactive silicone oil is substituted with alkenyl groups; dimethylpolysiloxanes which have both molecular terminals blocked with silanol groups and which took part in the condensation reaction but remained unreacted, and silicone oils, in which a part of methyl groups in the polysiloxane is substituted with the groups other than methyl, such as alkenyl groups, phenyl groups, and 3,3,3-trifluoropropyl groups. In addition, when the cured silicone powders are impregnated with non-crosslinking silicone oils subsequent to being cured, there are no particular limitations concerning these silicone oils.

Non-crosslinking organic oils of the present invention are exemplified by liquid paraffin, hexyl laurate, isopropyl myristate, myristyl myristate, cetyl myristate, 2-octyldodecyl myristate, isopropyl palmitate, 2-ethylhexyl palmitate, butyl stearate, decyl oleate, 2-octyldodecyl oleate, myristyl lactate, cetyl lactate, lanolin acetate, stearyl alcohol, cetostearyl alcohol, oleyl alcohol, avocado oil, almond oil, olive oil, cacao oil, jojoba oil, sesame oil, safflower oil, soybean oil, camellia oil, squalane, persic oil, castor oil, mink oil, cottonseed oil, palm oil, egg yolk oil, tallow, lard, glycol ester oils such as polypropylene glycol monooleate and neopentyl glycol 2-ethylhexanoate; polyhydric alcohol ester oils such as isostearate triglyceride and cocofatty acid triglycerides, and polyhydric alcohol ester oils such as isostearate triglyceride and cocofatty acid triglycerides; and polyoxyalkylene ether oils such as polyoxyethylene lauryl ether and polyoxypropylene cetyl ether. These organic oils can also be introduced into the curable silicone compositions before cure or the cured silicone powders (A) can be impregnated therewith.

The aforementioned non-crosslinking oils are liquids having a viscosity at 25° C., for example, within the range of from 1 to 100,000 centipoise, preferably 5 to 50,000 centipoise, and most preferably 5 to 10,000 centipoise. This is due to the fact that oils having a viscosity below this range are volatile and tend to present difficulties in terms of imparting durable water repellency to the resultant composite cured silicone powders. On the other hand, oils having a viscosity exceeding about 100,000 cP tend to present difficulties in terms of molding cured silicone powders having an average particle diameter of 100 micrometers or less, or in terms of impregnation of the cured silicone powder. The above mentioned silicone oils are preferable as such non-crosslinking oils from the standpoint of their superior affinity for cured silicone powders and the ability to impart durable water repellency to composite cured silicone powders.

For the purposes of the present invention, the amount of the non-crosslinking oils contained in the cured silicone powders (A) is, preferably, below 80 mass %, and, particularly preferably, 10 mass % to 50 mass %. This is due to the fact that when the amount of the non-crosslinking oils contained in the cured silicone powders is higher than the recommended limit, the mechanical strength of the cured silicone powders decreases, and the non-crosslinking oils tend to exude from the resultant composite cured silicone powders even under normal conditions. On the other hand, when the amount of the non-crosslinking oils contained in the cured silicone powders is lower than about 10 mass %, imparting sufficient hydrophilicity to the resultant composite cured silicone powders tends to become more difficult.

The cured silicone powders can be prepared by the following methods: grinding in a grinder the silicone powder obtained by curing curable silicone compositions described in items (i) to (iii) given below; curing the silicone compositions of items (i) to (iii) by spraying using a spray drier or other atomizing equipment; and curing the silicone compositions of items (i) to (iii) by dispersing them in water or aqueous dispersions of surface active agents.

(i) An addition-reaction-curable silicone composition that consists of an organopolysiloxane having in one molecule at least two alkenyl groups, an organopolysiloxane having in one molecule at least two silicon-bonded hydrogen atoms, a non-crosslinking oil, and a platinum catalyst.

(ii) A condensation-reaction-curable silicone composition that consists of an organopolysiloxane having in one molecule at least two silicon-bonded hydroxyl groups, or hydrolysable groups such as alkoxy groups, oxime groups, acetoxy groups, aminoxy groups, etc., a silane-type cross-linking agent having in one molecule at least three hydrolysable groups such as silicon-bonded alkoxy groups, oxime groups, acetoxy groups, aminoxy groups, etc., a non-crosslinkable oil, and a condensation-reaction catalyst, such as an organotin compound, an organotitanium compound, or the like.

(iii) An organoperoxide-curable silicone composition containing a non-crosslinking oil, and an organic peroxide.

Among the methods used for preparing the aforementioned cured silicone powders (A), the method in which these curable silicone compositions are cured by dispersing them in water or aqueous dispersions of surface active agents is particularly preferable from the standpoint that it results in the formation of spherical cured silicone powders of superior dispersibility in aqueous compositions.

In order to prepare aqueous dispersions of the curable silicone compositions, it is possible to use, for example, homogenizers, colloid mills and other stirring apparatuses, as well as ultrasonic vibrators and other mixing apparatuses. At such time, prior to preparing the water-based dispersions by using these curable silicone compositions, it is preferable to adjust the cure rate of these curable silicone compositions by cooling them in advance.

Also, in order to stabilize these curable silicone compositions in terms of particle shape, it is preferable to use aqueous dispersions of surface-active agents in water-based systems. These surface-active agents are additional component and different from "surface-active agents (C)" which are called hereinafter. The surface-active agents should be used in an amount of 0.1 to 20 parts by mass, preferably 0.5 to 10 parts by mass for each 100 parts by mass of the curable silicone composition. Also, the amount of the added water is preferably 40 to 2000 parts by weight, and particularly preferably, 40 to 1000 parts by weight per 100 parts by weight of the curable silicone composition. This is due to the fact that when the amount of the added water is less than about 40 parts by weight per 100 parts by weight of the curable silicone composition, a homogeneous water-based dispersion of the curable silicone composition is difficult to prepare, and when it exceeds about 2000 parts by weight, the characteristics of the cured silicone powder that are important for industrial production markedly deteriorate.

Also, from the standpoint of the relative difficulty of stabilizing the water-based dispersions of the curable silicone compositions, it is preferable to use ion-exchange water with a small amount of metal ions and halogen ions and an electric conductivity of 1 µS/cm or lower, and it is particularly preferable if it has an electric conductivity of not more than 0.5 µS/cm.

Water-based dispersions of cured silicone powder (A) can be prepared by curing the curable silicone composition in the aqueous dispersions by allowing the aqueous dispersions of the curable silicone compositions prepared in the manner described above to stand with heating or at room temperature.

In the case in which the water-based dispersions of the curable silicone compositions are heated, it is preferable if the heating temperature is not higher than 100° C., particularly between 10° C. and 95° C. A method, in which an aqueous dispersion is heated directly, or a method in which an aqueous dispersion is added to hot water, are suggested as examples of the methods used for heating the water-based dispersion of the curable silicone compositions.

Cured silicone powders (A) can be prepared by removing water from the aqueous dispersions of the cured silicone powders. Vacuum driers, hot-air-circulation ovens, spray driers and the like are suggested as examples of the methods used for removing water from water-based dispersions of the cured silicone powders.

[Inorganic Fine Powder (B)]

The inorganic fine powder (B) is used in the composite cured silicone powder of the invention for coating at least a part of the surface of the cured silicone powder (A). The particles of inorganic fine powder (B) may coat the entire surface of each cured silicone powder particle or may be discretely distributed over the aforementioned surface. Furthermore, the use of the coated cured silicone powders with inorganic fine powder particles partially chipped out from the coating surface presents no problem.

The use of aforementioned inorganic fine powder (B), at least on a part of the surfaces of the cured silicone powder particles (A), creates an obstacle for aggregation of these particles and improves flowability and dispersibility of the resulting composite cured silicone powder of the present invention.

The following materials are illustrative of suitable inorganic fine powders (B) according to the present invention: silicon oxide, titanium oxide, aluminum oxide, zirconium oxide, antimony oxide and other metal oxide fine powders; boron nitride, aluminum nitride, and other metal nitride fine powders; aluminum hydroxide, magnesium hydroxide, or a similar fine powders of metal hydroxides; a potassium carbonate, or similar metal carbonates; nickel, cobalt, iron, copper, gold, silver, or similar fine metal powders; mica, talc, kaolinite, smectite, halloysite, pyrophyllite, vermiculite, montmorillonite, fine sulfate powders, fine chloride powders, and the like. Fine powders most preferable from the point of view of availability and low cost are fine powders of metal oxides, in particular, fine powders of silica. The aforementioned inorganic fine powders (B) may have hydrophobic surface treated with such organosilicon compounds as organoalkoxysilane, organochlorosilane, organosilazane, or the like.

The particle diameter of the inorganic fine powder (B) should be sufficient for coating the surface of the cured silicone powder (A), and specifically it is preferable that the particle diameter should be not higher than 1/10 of the average particle diameter of the cured silicone powder (A). The inorganic fine powder particles (B) may be aggregated into secondary particles, from the point of view of improved dispersibility, it is preferable for the specific surface area of the particles to be not less than 10 $m^2/g$. In this case, the specific surface area is measured as a BET specific area value.

[Surface-Active Agent (C)]

In the composite cured silicone powder of the invention, the surface-active agent (C) is attached at least to a part of the surface of the inorganic fine powder (B). In the context of the present invention, the term "attached" means that the surface-active agent can cover the surface of the fine powder particles, can be absorbed by the aforementioned surface, or can be discretely distributed over the surfaces of the aforementioned particles. Furthermore, the principle of the invention is not violated if a part of the surface-active agent is also attached to or absorbed by the surface of the particles of cured silicone powder (A).

The surface-active agent (C), which in the composite cured silicone powder is present on the surfaces of the inorganic fine powder particles, is a component that improves hydrophilic properties of the composite cured silicone powder.

The surface-active agent (C) may be represented, e.g., by non-ionic surface-active agents, cationic surface-active agents, anionic surface-active agents, amphoteric surface-active agents, or by a combination of two or more of the aforementioned surface-active agents. The non-ionic surface-active agents are preferable from the point of view of better dispersiibility of the obtained composite cured silicone powder.

The following are examples of lipophilic non-ionic surface-active agents suitable for the invention: sorbitan monooleate, sorbitan monoisostearate, sorbitan monolaurate, sorbitan monopalmitate, sorbitan monostearate, sorbitan sesquioleate, sorbitan trioleate, penta-2-ethylhexyl acid diglycerol sorbitan, tetra-2-ethylhexyl acid diglycerol sorbitan, or a similar sorbitan fatty acid ester; mono-cotton seed oil fatty acid glycerine, mono-erucic acid glycerine, sesquioleic acid glycerine, mono-stearic acid glycerine, α,α'-oleic acid pyroglytamic acid glycerine, malic acid glycerine, or a similar glycerine fatty acid; mono-stearic acid propylene glycol, or a similar propylene glycol fatty acid ester; hydrogenated castor oil derivative, glycerin alkyl ethers, etc.

Hydrophilic non-ionic surface-active agents can be represented by polyoxyethylene (hereinafter POE) sorbitan monooleate, POE sorbitan monostearate, POE sorbitan tetraoleate, or a similar POE sorbitan fatty acid ester; POE sorbitol monolaurate, POE sorbitol monooleate, POE sorbitol pentaoleate, POE sorbitol monostearate, or a similar POE sorbitol fatty acid ester; POE glycerine monostearate, POE glycerine monoisostearate, POE glycerine triisostearate, or a similar POE glycerine fatty acid ester; POE monooleate, POE monostearate, POE distearate, POE monodioleate, distearic acid ethylene glycol, or a similar POE fatty acid ester; POE lauryl ether, POE oleyl ether, POE stearyl ether, POE behenyl ether, POE 2-octyldodecyl ether, POE cholestanol ether, or a similar POE alkyl ether; POE octylphenyl ether, POE nonylphenyl ether, POE dinonylphenyl ether, or a similar POE alkylphenyl ether; Pulronic (polyoxyethylene-polyoxypropylene glycol) type surface-active agents; POE—polyoxypropylene (hereinafter POP) cetyl ether, POE-POP 2-decyltetradecyl ether, POE-POP monobutyl ether, POE-POP hydrogenated lanolin, POE-POP glycerine ether, or a similar POE alkyl ether; tetra POE-POP ethylenediamine condensates such as Tetronic, etc.; POE castor oil, POE hydrogenated castor oil, POE hydrogenated castor oil monoisostearate, POE hydrogenated castor oil triisostearate, POE hydrogenated castor oil pyroglytamic monoisostearic acid diester, POE hydrogenated castor oil maleic acid, or a similar POE castor oil or POE hydrogenated castor oil derivative; POE sorbitol-beeswax or a similar POE beeswax-lanolin derivative; cocofatty acid diethanolamide, lauric acid monoethanolamide, fatty acid isopropanolamide, or a similar alkanolamide, POE propylene glycol fatty acid ester, POE alkylamide, sucrose fatty acid ester, POE nonylphenylformaldehyde condensate, alkylethoxydimethylamineoxide, trioleylphosphoric acid, etc.

Silicone-type surface-active agents can be exemplified by dimethylpolysiloxane-polyethylene glycols, dimethylpolysiloxane-polyethyleneglycol copolymers, dimethylpolysiloxane-methyl (polyoxyethylene) siloxane copolymers, or the like. Among the above-mentioned non-ionic surface-active agents, most preferable from the point of view of better conditions for handling in a liquid state, are non-ionic surface-active agents that contain polyethyleneoxide groups, in particular those alkyl ethers of polyethylene oxides that have in the alkyl ether at least 10 mass % of alkyl groups having 13 carbon atoms, or polyoxyethylene sorbitan monolauryl ether. These non-ionic active agents can be selectively used in combinations of two or more.

[Composite Cured Silicone Powder]

There are no special restrictions with regard to the amounts in which the inorganic fine particles (B) and the surface-active agent (C) should be attached to the cured silicone powder (A), provided that these components ensure sufficient flowability and hydrophilicity of the obtained composite cured silicone powder. Furthermore, the aforementioned attached amounts of the inorganic fine particles (B) and the surface-active agent (C) may vary, depending on the diameter of the cured silicone particles (A), but, in general, the inorganic fine powder (B) and the surface-active agent (C) should be used in an amount of 0.1 to 30 parts by mass of the inorganic fine particles (B) and 0.1 to 30 parts by mass of the surface-active agent (C) for each 100 parts by weight of the cured silicone powder (A). It is more preferable to use the inorganic fine powder particles (B) in an amount of 0.2 to 10 parts by mass and the surface-active agent (C) in an amount of 0.2 to 10 parts by mass for each 100 parts by weight of the cured silicone powder (A). If the aforementioned components (B) and (C) are used in amounts beyond the recommended limits, it will either lead to decrease in flowability or will make it difficult to improve hydrophilicity.

The following is a more detailed description of the method for manufacturing the composite cured silicone powder of the present invention.

More specifically, the composite cured silicone powder of the invention is produced by mixing the following components under conditions of mechanical shearing: a cured silicone powder (A) that has an average particle size of 0.1 to 500 micrometers, an inorganic fine powder (B), and a surface-active agent (C).

Mixing of components (A)-(C) with application of mechanical shearing can be carried out, e.g., with the use of a Henschel mixer or a super-mixer.

Also, there are no particular limitations regarding the temperature used for mixing these powders; for example, mixing can be conducted at room temperature. Also, because cured silicone powders (A), which lack flowability, start to exhibit flowability when their surface is coated with inorganic fine powders (B), the duration of mixing has to be appropriately determined by observing changes in this property.

In accordance with the manufacturing method of the present invention, the composite cured silicone powder can be prepared by mixing the cured silicone powder (A) with the inorganic fine powder (B), and then compounding the obtained mixture with the surface-active agent (C). Localization of the particles of the surface-active agent (C) on the surfaces of the inorganic fine powder (B), which, in turn, is attached to the surfaces of the cured silicone powder (A) improves hydrophilicity of the obtained composite cured silicone powder.

In accordance with the manufacturing method of the present invention, the amount of the added inorganic fine powders (B) should be sufficient to coat the surface of the cured silicone powders, and although it depends on the amount of the non-crosslinking oil contained in the cured silicone powders, generally speaking, it is preferable for their amount to be between 0.1 and 100 parts by weight, preferably 1 to 50 parts by weight, per 100 parts by weight of the cured silicone powder (A).

The amount of the surface-active agent (C) used in the method for manufacturing the composite cured silicone powder of the present invention should be sufficient for imparting to the composite powder hydrophilic properties, and although this amount will be different depending on the amount of the inorganic fine powder (B) added to the cured silicone powder (A), in general, it should be within the range of 0.1 to 100 parts by mass, preferably between 0.5 and 50 parts by mass for each 100 parts by mass of the cured silicone powder (A).

[Aqueous Composition]

The aqueous composition of the present invention is the one containing the aforementioned composite cured silicone powder of the present invention.

The aqueous composition of the present invention that contains composite cured silicone powder can be illustrated, e.g., as a liquid composition obtained by dispersing the following components in an aqueous medium: a curable resin composition, a non-curable resin composition, and an aqueous dispersion, e.g., of a cosmetic substance. There are no special restrictions with regard to the amount of water in the aforementioned aqueous composition, but in order to facilitate dispersion of the composite cured silicone powder in an aqueous phase, water should be added in an amount that allows using of the aqueous medium as a matrix phase.

As has been described above, when the composite cured silicone powder of the present invention contains the inorganic fine powder (B) attached to the cured silicone powder (A) having an average diameter of particles between 0.1 and 500 micrometers and when the surface-active agent (C) is attached to the surfaces of the aforementioned inorganic fine powder, then it becomes possible, without sacrificing the flowability and dispersibility provided by the inorganic fine powder (B), to improve hydrophilic properties acquired due to the use of the surface-active agent (C). More specifically, if the inorganic fine powder (B) had not been present on the surface of the cured silicone powder (A) and only the surface-active agent (C) had been attached to the surface of the cured silicone powder, then the surface-active agent (C) would assist in aggregation of the particles of the cured silicone powder (A) and thus would lead to decrease in dispersibility of the composite powder. On the other hand, the presence of the inorganic fine powder. (B) on the surfaces of the cured silicone powder (A) causes the surface-active agent (C) to attach to the surfaces of the inorganic fine powder (B) and thus to create an obstacle for aggregation of the cured silicone powder (A) under the effect of the surface-active agent (C) and, at the same time, to impart hydrophilicity to the composite silicone particles.

Since the composite cured silicone powder of the present invention is characterized by excellent flowability, hydrophilic properties, and dispersibility, it has good compatibility with aqueous compositions and can be easily dispersed in such compositions. Therefore, the composite cured silicone powder of the present invention can be used as an additive and a property improver, e.g., for improving dullness, when used in aqueous compositions such as water-based coating materials, and for improving tactile feeling when used in water-based cosmetic materials; it also improves resistance to cracking, resistance to the loss of resiliency, etc.

PRACTICAL EXAMPLES

The composite cured silicone powder and the method of the present invention will now be described in more detail with reference to practical examples. The term "viscosity" used in the practical examples designates a viscosity value measured at a temperature of 25° C. Also, the characteristics of the cured silicone powders (A) and the composite cured silicone powders were measured in the following manner.

[JIS A Hardness of Cured Silicone Powder]

Curable silicone compositions, which were used as starting materials for the cured silicone powder (A), were cured in sheet form and their hardness was measured by using a JIS A hardness tester conforming to JIS K 6301.

[Content of Non-Crosslinking oil in Cured Silicone Powder]

Dispersion was prepared by adding 1000 g of toluene to 100 g of cured silicone powder, and, upon subjecting the dispersion to agitation using an agitator (e.g., a homodisper) at 1000 rpm for 10 minutes and then at 500 rpm for another 10 minutes, it was allowed to stand at room temperature for 12 hours. After that, the dispersion was again subjected to agitation at 500 rpm for 10 minutes using a homodisper. The dispersion was filtered through filter paper and the filtrate was collected. Then, dispersion was prepared by adding 750 g of toluene to the cured silicone powder remaining on the filter paper, and this dispersion was subjected to agitation at 1000 rpm for 10 minutes using a homodisper. The dispersion was filtered through filter paper and the filtrate was collected. After adding this filtrate to the previously obtained filtrate, toluene was removed therefrom by using an evaporator maintained at a temperature of 80° C. and a pressure of 70 mmHg. The viscosity and weight of the resultant oil were measured. Also, the components of this oil were determined by subjecting the oil to proton nuclear magnetic spectroscopy, gel permeation chromatography, and infrared spectroscopic analysis.

[Average Particle Size]

Measurement was carried out on an aqueous dispersion or an ethanol dispersion of the cured silicone powder or the composite cured silicone powder using a laser diffraction instrument for measuring particle size distributions, Model LA-500 from Horiba Seisakusho. A median diameter, which is the particle diameter corresponding to 50% of the cumulative distribution, was reported as the average particle size.

[Flowability]

The flowability of the cured silicone powders (A), or the composite cured silicone powders, was evaluated based on the mass % of the powders that passed through the 100-mesh air-jet sieve (sieve opening=150 micrometers) manufactured by Alpine Co.

[Hydrophilic Properties]

One gram of a cured silicone powder (A) or a composite cured silicone powder was added to 100 mL of water and mixed therewith using an agitator. A cured silicone powder (A) or a composite cured silicone powder that did not mix with water and floated on the surface was considered to be water repellent and designated with (XX). A power that was miscible with water but not dispersible in it was designated with (X), whereas a powder that was dispersed in water was designated with (◯).

Given below is a description of each component that was used in the subsequent practical examples.

[Cured Silicone Powder (A)]

(A-1) Silicone rubber powder of the addition-reaction-curable polydimethyl siloxane contained 0.2 mass % of the non-ionic surface-active agent and 2.8 mass % of 20-30-mers of cyclic polydimethylsiloxane origomer. Average particle size of the silicone powder was 4 micrometers. JIS-A hardness was 30.

(A-2) Silicone rubber powder of the addition-reaction-curable polydimethyl siloxane contained 1.5 mass % of the non-ionic surface-active agent and 2.8 mass % of 20-30-mers of cyclic polydimethylsiloxane origomer. Average particle size of the silicone powder was 4 micrometers. JIS-A hardness was 30.

[Inorganic Fine Powder (B)]

Aerosil 200: the product of Aerosil Co.; an average size of primary particles 5-15 nm, BET specific surface area 200 $m^2/g$, dry-process silica, surface silanol density 4.2/$nm^2$.

[C)Surface-Active Agent]

A mixture of a secondary dodecylether and secondary tridecylether of ethyleneoxide (12 mole added): dodecyl groups 43 mass %, tridecyl groups 57 mass %, HLB =14.5.

Practial Example 1

A super mixer (Henschel-type mixer, the product of Kawata Co., Ltd,; inner volume 20 L) was loaded with the silicone rubber powder (A-1), and the content was stirred for about 2 min. at room temperature with the frequency of rotation equal to 2000 rpm. The block-shaped lumps were ground. The obtained powder was combined with fine inorganic powder (B), and the components were mixed for 3 min. at room temperature with a rotation frequency of 2000 rpm. The mixture was combined with the surface-active agent (C), and the components were again mixed for 2 min. with a frequency of rotation of 2000 rpm. The total weight of the composition was 1 kg. And silicone rubber powder (A-1), fine inorganic powder (B), and surface-active agent (C) were used per 1 kg of the total weight of the composition in the following proportions: mass ratio (A-1/B/C)=20/2.9/1.1. The obtained composite cured silicone powder was evaluated with regard to hydrophilicity and flowability. The results are shown in Table 1.

Practical Example 2, Comparative Examples 1~4

The cured silicone powders (A) and the composite cured silicone powders were obtained by the same method as in Practical Example 1, except that types and quantities of the cured silicone powders and quantities of the inorganic fine powders were changed as shown in Table 1.

Results of evaluation of hydrophilicity and flowability in the obtained composite cured silicone powder and cured silicone powder are also shown in Table 1.

TABLE 1

|  |  | Pr. Ex. | | Comp Ex. | | | |
| --- | --- | --- | --- | --- | --- | --- | --- |
|  |  | 1 | 2 | 1 | 2 | 3 | 4 |
| Composition (mass %) | (A-1)Silicone rubber powder | 20 |  | 20 | 20 | 20 |  |
|  | (A-2) Silicone rubber powder |  | 20 |  |  |  | 20 |
|  | (B) Inorganic fine powder | 2.9 | 3.4 |  | 2.9 |  |  |
|  | (C) Surface-active agent | 1.1 | 1.6 |  |  | 1.1 | 1.6 |
| Properties | Hydrophilicity | ○ | ○ | xx | xx | x | xx |
|  | Flowability (mass %) | 99 | 99 | 52 | 99 | 31 | 98 |

Practical Example 3

A mill (small-size crusher SM-1 of Iuchi Seiei Do Co., Ltd., inner volume 58.5 cm³) was loaded with a mixture of the following components: 40 parts by mass of the composite cured silicone powder obtained in Practical Example 1; 1 part by mass of silicone-treated titanium oxide; 5 parts by mass of a p-methoxy cinnamic acid octyl; 10 parts by mass of a dimethylpolysiloxanes having 20mPa.s viscosity and both ends of the molecular chain blocked by trimethylsiloxy groups; 3 parts by mass of hydrogenated castor oil; 30 parts by mass of squalane; 5 parts by mass of glycerol; 3 parts by mass of beeswax; an appropriate amount of antiseptics; an appropriate amount of fragrants, and an appropriate amount of purified water. The components were then stirred for 5 min. to form a creamy cosmetic product of Practical Example 3. The results of evaluation of this product are shown in Table 2.

The size of composite cured silicone particles in the obtained cosmetic product was determined by several measurements under an optical microscope. Compoundability was judged by the degree of increase in viscosity of the creamy cosmetic product. More specifically, a significant increase in viscosity was considered as a criterion of poor dispersibility.

Practical Example 4, Comparative Examples 5~7

In Practical Example 4 and in Comparative Examples 5~7, the cosmetic products were obtained by the same method as in Practical Example 3, with the exception that composite cured silicone particles were different from those used in Practical Example 2, Comparative Example 2, and Comparative Example 4, respectively. Results of evaluation of the obtained cosmetic products are shown in Table 2.

TABLE 2

|  | Pr. Ex. 3 | Pr. Ex. 4 | Comp. Ex. 5 | Comp. Ex. 6 | Comp. Ex. 7 |
| --- | --- | --- | --- | --- | --- |
| Compoundability | Easily dispersed | Easily dispersed | Poorly dispersed | Poorly dispersed | Poorly dispersed |
| Tictile feeling | Good | Good | Rough | Pretty rough | Rough |
| Conditions of dispersion of cured silicone particles in cosmetic products (%) | | | | | |
| Less than 50 μm | 100 | 100 | 30 | 80 | 40 |
| Greater than 50 μm | 0 | 0 | 70 | 20 | 60 |

Practical Example 5

An aqueous coating composition of Practical Example 5 was prepared by mixing and stirring for 20 sec. 20 parts by mass of the composite cured silicone powder obtained in Practical Example 1 and 100 parts by weight of an aqueous coating material (one layer of aqueous acrylic coating, the product of Kanpe Papio Co., Ltd., blue color). Mixing was carried out in a dental mixer. The obtained aqueous coating composition was applied onto an aluminum plate and spread out with the use of a (40 micrometer thick) cellophane tape while controlling the thickness of the coating layer. The coating was then naturally dried for one week in a draft at room temperature. The resulting dry coating film had a thickness of 20-50 micrometers. The composition was evaluated by the same method as in Practical Example 3. Results of evaluation of the obtained aqueous coating composition are shown in Table 3. Dispersion conditions of the cured silicone particles contained in the obtained coating film were evaluated by several observations under an optical microscope. Compoundability was judged by the degree of increase in the viscosity of the coating composition. More specifically, a significant increase in viscosity was considered as a criterion of poor dispersibility.

Practical Example 6, Comparative Example 8, 9

In Practical Example 6 and in Comparative Examples 8 and 9, the aqueous coating compositions were obtained by the same method as in Practical Example 5, with the exception that composite cured silicone particles were different from those used in Practical Example 2, Comparative Example 2, and Comparative Example 3, respectively. Results of evaluation of the obtained cosmetic products are shown in Table 3.

TABLE 3

|  | Pr. Ex. 5 | Pr. Ex. 6 | Comp. Ex. 8 | Comp. Ex. 9 |
|---|---|---|---|---|
| Compoundability | Easily dispersed | Easily dispersed | Poorly dispersed | Poorly dispersed |
| Glossiness | Soft dullness | Soft dullness | Rough | Pretty rough |
| Dispersibility of cured silicone particles in coating films (%) | | | | |
| Less than 50 μm | 100 | 100 | 10 | 80 |
| Greater than 50μ | 0 | 0 | 90 | 20 |

EFFECTS OF THE INVENTION

Since, as has been shown above, the composite cured silicone powder of the present invention is prepared from cured silicone powder (A) that has an average particle size of 0.1 to 500 micrometers, an inorganic fine powder (B) coated on the surface of the cured silicone powder (A), and a surface-active agent (C) coated on the surface of said inorganic fine powder, the resulting composite cured silicone powder acquires excellent flowability, hydrophilicity, and dispersibility. An aqueous coating material prepared with the use of such a composite cured silicone powder produced uniform and matt coatings. When the aforementioned composite cured silicone powders are used for the preparation of a water-based cosmetic materials, these materials result in good tactile feel.

The resulting composite cured silicone powder acquires excellent flowability, hydrophilicity, and dispersibility due to the fact that the aforementioned cured silicone powder (A), the inorganic fine powder (B), and the surface-active agent (C) are mixed under conditions of mechanical shearing.

Furthermore, the fact that the inorganic fine powder (B) may comprise such easily obtainable materials as fine powder of metal oxides, especially silica, contributes to low manufacturing cost of the product.

Another factor contributing to improved flowability of the obtained powder is that the aforementioned inorganic fine powder (B) has specific surface area exceeding 10 m$^2$/g. Various characteristics and advantages for use of the present invention become especially obvious when the cured silicone powder is a silicone rubber powder.

The resulting composite cured silicone powder acquires excellent flowability, hydrophilicity, and dispersibility also due to the method of the invention for manufacturing of the aforementioned composite cured silicone powder, which consists of mixing the cured silicone powder (A) that has an average particle size of 0.1 to 500 micrometers, the inorganic fine powder (B), and the surface-active agent (C) under conditions of mechanical shearing. Another factor that contributes to improvement in the flowability, hydrophilicity, and dispersibility of the obtained composite cured silicone powder is that in the aforementioned method of the invention the cured silicone powder (A) and the inorganic fine powder (B) can be mixed together under conditions of mechanical shearing and then the obtained mixture can be combined with the surface-active agent (C) and mixed together with this agent again under conditions of mechanical shearing.

Furthermore, since the aqueous composition of the invention contains the aforementioned composite silicone powder, the composition becomes suitable for use in the preparation of water-based coatings with uniform dullness on the coated surfaces, as well as in the preparation of water-based cosmetic products with improved tactile feel.

The invention claimed is:

1. A composite cured silicone powder comprising:
   cured silicone powder (A) that has an average particle size of 0.1 to 500 micrometers;
   an inorganic fine powder (B) coated on a surface of said cured silicone powder (A); and
   a surface-active agent (C) coated on a surface of said inorganic fine powder (B).

2. The composite cured silicone powder of claim 1, wherein said cured silicone powder (A), said inorganic fine powder (B), and said surface-active agent (C) are mixed under conditions of mechanical shearing.

3. An aqueous composition comprising said composite cured silicone powder of claim 2.

4. The composite cured silicone powder of claim 1, wherein said inorganic fine powder (B) is a fine powder of a metal oxide.

5. The composite cured silicone powder of claim 4, wherein said fine powder of said metal oxide has a particle diameter equal to or less than $\frac{1}{10}$ of said average particle size of said cured silicone powder (A).

6. The composite cured silicone powder of claim 1, wherein said inorganic fine powder (B) has a specific surface area of not less than 10 m$^2$/g.

7. An aqueous composition comprising said composite cured silicone powder of claim 6.

8. The composite cured silicone powder of claim 1, wherein said inorganic fine powder (B) is silica.

9. An aqueous composition comprising said composite cured silicone powder of claim 8.

10. The composite cured silicone powder of claim 1, wherein said cured silicone powder (A) is a silicone rubber powder.

11. An aqueous composition comprising said composite cured silicone powder of claim 10.

12. The composite cured silicone powder of claim 10, wherein said silicone rubber powder is polydimethyl siloxane cured by addition reaction.

13. An aqueous composition comprising said composite cured silicone powder of claim 1.

14. The composite cured silicone powder of claim 1, wherein said cured silicone powder (A) is cured by addition reaction, condensation reaction, reaction promoted by an organoperoxide, or reaction promoted by ultraviolet radiation.

15. The composite cured silicone powder of claim 1, wherein said cured silicone powder (A) has a JIS A durometer hardness equal to or less than 90.

16. The composite cured silicone powder of claim 1, wherein said cured silicone powder (A) is a silicone gel powder or a silicone resin powder.

17. The composite cured silicone powder of claim 1, further comprising a non-crosslinking oil.

18. The composite cured silicone powder of claim 17, wherein said non-crosslinking oil is a non-crosslinking silicone oil or a non-crosslinking organic oil.

19. A method for producing a composite cured silicone powder comprising mixing the following components under conditions of mechanical shearing: a cured silicone powder (A) that has an average particle size of 0.1 to 500 micrometers, an inorganic fine powder (B), and a surface-active agent (C).

20. The method for producing a composite cured silicone powder of claim 19, wherein the cured silicone powder (A) and the inorganic fine powder (B) are mixed with mechanical shearing, and then are mixed with the surface-active agent (C) also with mechanical shearing.

* * * * *